(12) United States Patent
Borkar et al.

(10) Patent No.: US 7,774,590 B2
(45) Date of Patent: Aug. 10, 2010

(54) RESILIENTLY RETAINING STATE INFORMATION OF A MANY-CORE PROCESSOR

(75) Inventors: Shekhar Borkar, Beaverton, OR (US); Yatin Hoskote, Portland, OR (US); Shu-Ling Garver, Scappoose, OR (US)

(73) Assignee: Intel Corporation, Santa Clara, CA (US)

( * ) Notice: Subject to any disclaimer, the term of this patent is extended or adjusted under 35 U.S.C. 154(b) by 983 days.

(21) Appl. No.: 11/387,385

(22) Filed: Mar. 23, 2006

(65) Prior Publication Data

US 2007/0226482 A1 Sep. 27, 2007

(51) Int. Cl.
*G06F 15/177* (2006.01)
(52) U.S. Cl. .......................................... 713/100; 713/1
(58) Field of Classification Search ...................... 713/1, 713/100
See application file for complete search history.

(56) References Cited

U.S. PATENT DOCUMENTS

| | | | |
|---|---|---|---|
| 5,844,917 A * | 12/1998 | Salem et al. ................. 714/724 |
| 6,134,675 A | 10/2000 | Raina | |
| 2003/0005380 A1 | 1/2003 | Nguyen et al. | |
| 2004/0123201 A1 | 6/2004 | Nguyen et al. | |
| 2005/0240850 A1 | 10/2005 | Ohwada et al. | |
| 2006/0015674 A1 * | 1/2006 | Murotake ..................... 711/101 |
| 2006/0015862 A1 * | 1/2006 | Odom et al. ................. 717/168 |
| 2006/0114024 A1 * | 6/2006 | Feng et al. ..................... 326/41 |
| 2006/0171244 A1 * | 8/2006 | Ando .......................... 365/233 |
| 2007/0033425 A1 * | 2/2007 | Clark ........................... 713/320 |

OTHER PUBLICATIONS

U.S. Appl. No. 11/238,488, filed Sep. 28, 2005, entitled "Reliable Computing With a Many-Core Processor," by Shekhar Borkar, et al.
U.S. Appl. No. 11/238,487, filed Sep. 28, 2005, entitled "Power Delivery and Power Management of Many-Core Processors," by Shekhar Borkar, et al.

* cited by examiner

*Primary Examiner*—Tse Chen
(74) *Attorney, Agent, or Firm*—Trop, Pruner & Hu, P.C.

(57) ABSTRACT

In one embodiment, the present invention includes a method for performing dynamic testing of a many-core processor including a plurality of cores, manipulating data obtained from the dynamic testing into profile information of the many-core processor, and storing the profile information in a non-volatile memory. The non-volatile memory may be within the many-core processor, in some embodiments. Other embodiments are described and claimed.

19 Claims, 5 Drawing Sheets

RESILIENTLY RETAINING STATE INFORMATION OF A MANY-CORE PROCESSOR

BACKGROUND

Embodiments of the present invention relate generally to processors, and more particularly to processors including multiple cores such as many-core processors.

A many-core processor includes multiple processing cores on one or more die, typically on a single die. As process technologies scale to very small dimensions, the prevailing design approach of achieving high performance by increasing processor frequency is limited due to increased power consumption. One alternative approach to achieve high performance is to distribute an application across many "small" cores that run concurrently at slower speeds than a typical "larger" core. Because each "small" core is simpler, smaller and far less power hungry than a "large" core while still delivering significant performance, a many-core design can help manage power consumption more efficiently than a single or large-core design.

Although a many-core processor has advantages over a processor with a single core or a few large cores, it also faces many challenges as process technologies scale down. For example, process variations, either static or dynamic, can make transistors unreliable; transient error rates may be high since capacitance on storage nodes is small and voltages are low; and reliability over time may deteriorate as transistor degradation becomes more severe as years pass. Thus one-time factory testing and burn-in, as implemented for conventional processors, becomes less effective to ensure reliable computing over time with a many-core processor.

DETAILED DESCRIPTION

Embodiments of the present invention may use a non-volatile memory to resiliently store profile information of a many-core processor. The many-core processor may include a large number of small cores situated on a single die of a semiconductor package. Further, in various implementations the non-volatile memory may also be situated on the same die as the cores. The many-core processor may be dynamically tested, e.g., via self-testing to obtain profile information for storage in the non-volatile memory.

As will be described further below, various profile information may be stored in the non-volatile memory. In different embodiments, such profile information may include frequency and voltage information regarding cores, as well as dynamic information. Additional resilient state of the many-core processor may be further stored in the non-volatile memory. Such resilient state information may include performance information, as will be discussed further below. Still further, task allocation information regarding tasks allocated to various operating cores can be stored. To aid in such tasks, the non-volatile memory may further store a configuration of an interconnect fabric that couples the operating cores together. Of course, additional profile information may be stored in the non-volatile memory in different embodiments.

In various embodiments, cores of a many-core processor may be periodically tested to obtain and/or refresh their dynamic profiles. The dynamic profile of a core may include information on its maximum operating frequency, power consumption, power leakage, and functional correctness, among other parameters. The dynamic profile may also include trending information of these parameters, indicating reliability of a corresponding core over time.

In various embodiments, tasks may be allocated and dynamically reallocated to cores based on current core profiles. If these profiles change during execution, e.g., as a result of updated profile information, task allocation may be dynamically changed to maintain a desired performance level. Thus this task allocation information may also be stored as part of the resilient state and any updates to this task allocation mapping may also be stored in non-volatile memory.

Figure 1:
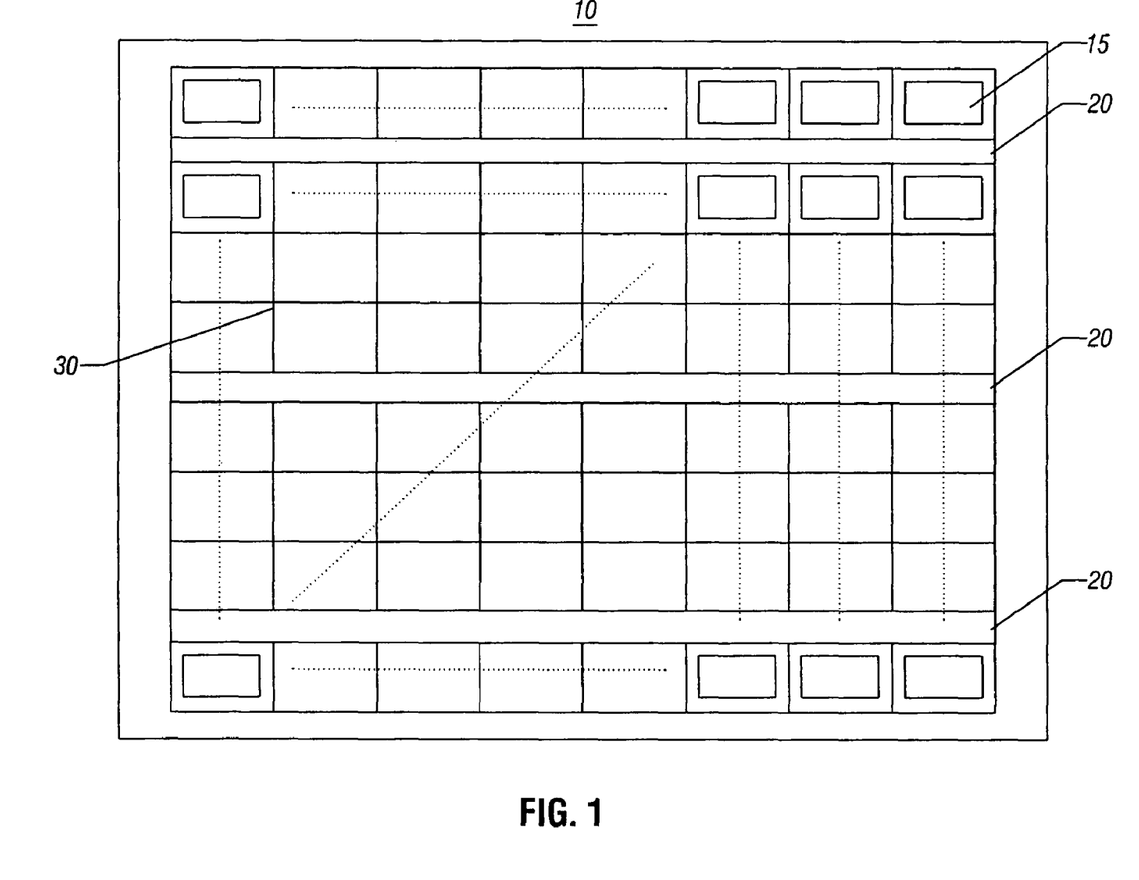
FIG. 1 is a block diagram of a many-core processor in accordance with one embodiment of the present invention.

Referring now to FIG. 1, shown is a block diagram of a many-core processor in accordance with one embodiment of the present invention. As shown in FIG. 1, processor 10 includes a plurality of individual cores 15. More specifically, the embodiment of FIG. 1 shows a configuration that includes an 8×8 array of cores coupled via an interconnect fabric 30. While shown with this particular implementation in the embodiment of FIG. 1, it is to be understood that the scope of the present invention is not so limited, and in other embodiments other configurations may be present, such as one-dimensional, two-dimensional or three-dimensional meshes or one-dimensional, two-dimensional, or three-dimensional torus configurations, for example. Further, while shown with 64 individual cores in the embodiment of FIG. 1, it is to be understood that many-core processors may include more or fewer such cores in different implementations.

Each core 15 may be a relatively small core, at least compared with single core or dual-core processors. In various embodiments, each core 15 may include a local memory (e.g., a cache memory) and further may be coupled to shared memory. Specifically, as shown in FIG. 1, a shared memory 20, which is a global shared memory, may be coupled to individual cores 15 via interconnect fabric 30. While not shown in FIG. 1 for ease of illustration, it is to be understood that processor 10 may include other components, such as input/output (I/O) interfaces, interconnects, buses, logic and the like.

Cores 15 may be selected for activation based on various algorithms. To effect such activations, interconnect fabric 30 may also be configurable so as to enable improved connectivity between activated cores 15, increasing communication speeds. In the embodiment of FIG. 1, resilient state data regarding the various cores 15 may be stored in non-volatile memory present within the cores themselves. Alternately, a non-volatile memory may be located within a processor but outside the cores of the processor. However, in other embodiments the resilient state data may be stored in a non-volatile memory external to processor 10.

Figure 2:
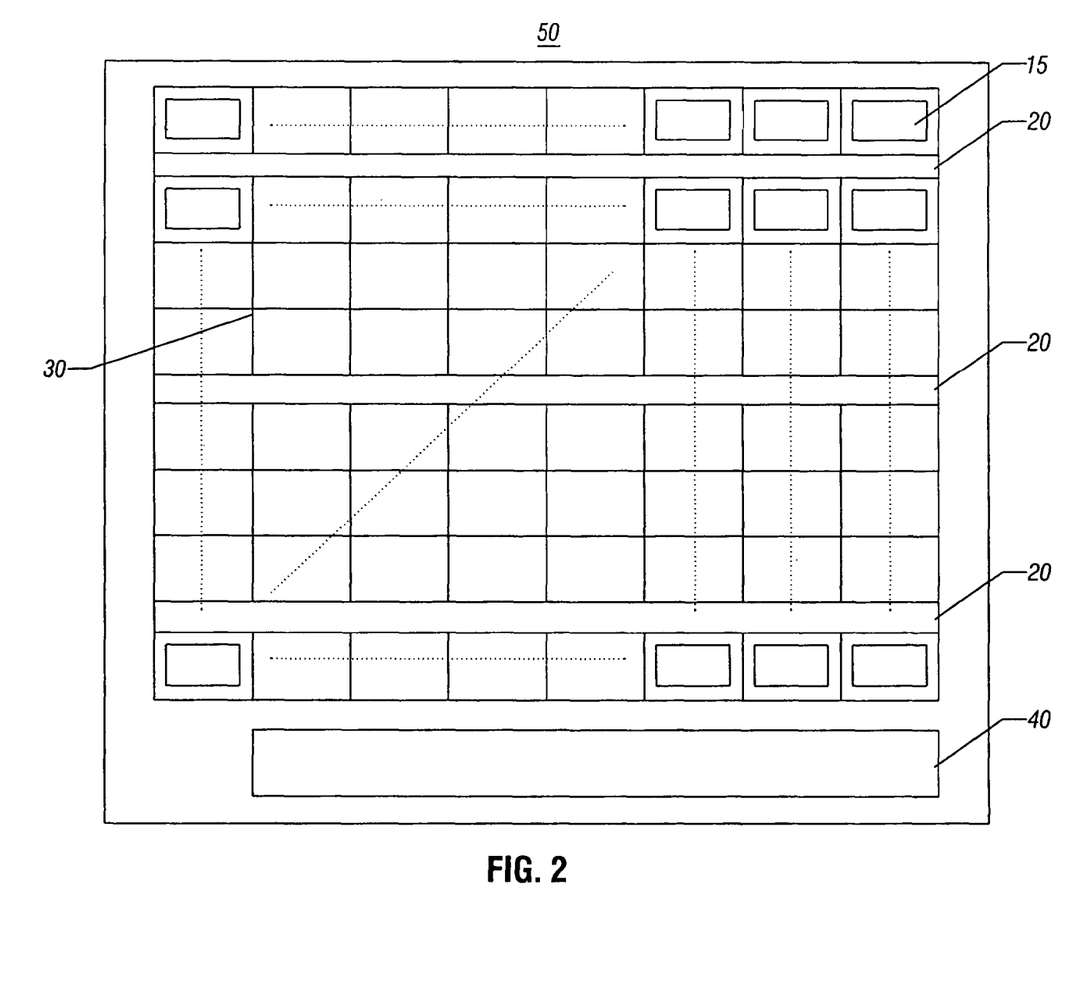
FIG. 2 is a block diagram of a many-core processor in accordance with another embodiment of the present invention.

Referring now to FIG. 2, shown is a block diagram of a many-core processor in accordance with another embodiment of the present invention. As shown in FIG. 2, processor 50 may include similar components to those discussed above regarding FIG. 1. Specifically, a plurality of cores 15 may be coupled via an interconnect fabric 30. Furthermore, a shared memory 20 may be present. However, in the embodiment of FIG. 2, a non-volatile memory 40 may be located within processor 50. Non-volatile memory 40 may be used to store resilient state data regarding cores 15. While shown in the embodiment of FIG. 2 as being implemented on the same die as cores 15, non-volatile memory 40 may be located within a package of processor 50 but on a separate die, in other embodiments. Of course, other implementations are possible.

Figure 3:
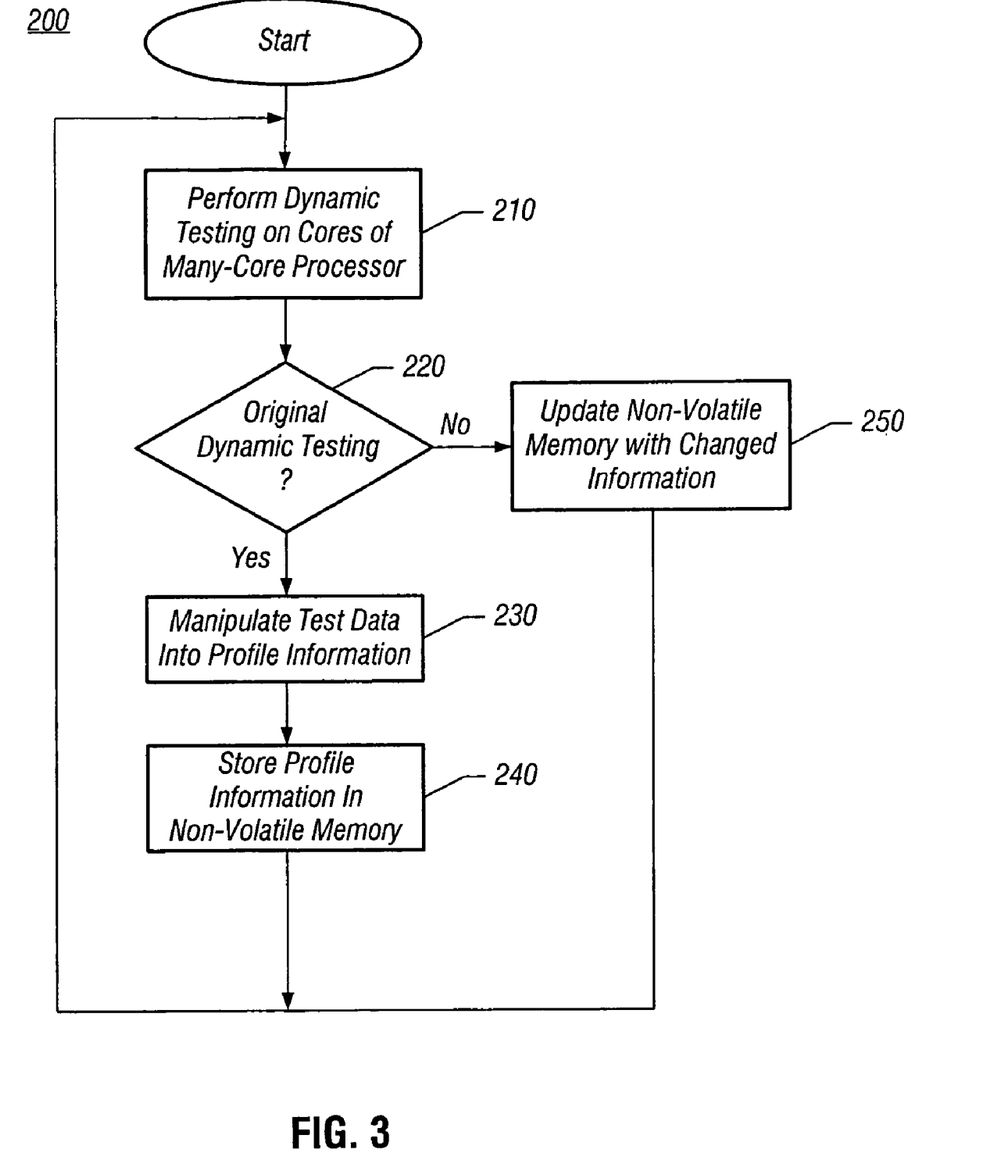
FIG. 3 is a flow diagram of a method in accordance with one embodiment of the present invention.

Referring now to FIG. 3, shown is a flow diagram of a method in accordance with one embodiment of the present invention. As shown in FIG. 3, method 200 may be used to obtain profile information and store the obtained information in a non-volatile memory. Method 200 may begin by performing dynamic testing on the cores of a many-core processor (block 210). Such dynamic testing may take various forms. For example, at regular intervals a dynamic testing process may be initiated in which neighboring cores test the capabilities of other neighboring cores. Alternately, one or more cores of the many-core processor may be selected as dedicated (i.e., checker) cores for performing such dynamic testing. In this way, the many-core processor is capable of self-testing to determine its operating capabilities.

As discussed above, various parameters may be determined based upon the testing. For example, voltage and frequency values such as maximum operating frequency and operating voltage may be determined. Furthermore, functional correctness of cores may be determined, e.g., by performing one or more operations in multiple cores and comparing the results. If the results differ, one of the cores may be indicated as failing the functional correctness test.

Still referring to FIG. 3, next it may be determined whether the dynamic testing is the original dynamic testing on the many-core processor (diamond 220). This original dynamic testing may correspond to testing performed upon an initial power up of a system including the many-core processor. If the testing is the original dynamic testing, control passes to block 230. There, the test data may be manipulated into profile information (block 230). Various manners of manipulating the data are possible. For example, test data regarding operating speeds of the cores may be manipulated into a so-called bin value. That is, each core may be partitioned into one of a selected number of bins based on its maximum operating speed. Accordingly, the cores of the many-core processor may be segmented into multiple bins, for example, a fast bin, a medium bin, and a slow bin. Furthermore, any failed cores that are unable to further operate may be placed in a failed bin. In addition to such bins for speeds, operating cores may also be segmented into active cores and spare cores, where the active cores may be selected for operation according to a particular configuration, while the spare cores may remain in a spare pool for later configuration to the active state, e.g., when one or more of the active cores later fails. In this way, lifetime reliability of the many-core processor may be enhanced.

Note that the mix of cores in different bins may be tuned to obtain better control of the number of cores in a particular bin. The total mix of cores may be recorded as part of the resilient state. Over time, one or more cores may be moved from a fast bin to a slower bin due to degradation in performance. However, the total performance of the many-core processor may be maintained by adjusting a mix of cores or adjusting operating parameters of one or more cores. For example, a spare core may be added to a fast bin. Alternately, an existing core may be run at a higher frequency using voltage scaling or body bias techniques. In some embodiments, voltage, bias values, and frequency of each core may also be recorded as part of the resilient state.

Still referring to FIG. 3, next the profile information may be stored in non-volatile memory (block 240). As described above, this non-volatile memory may be configured in various manners. For example, a single substrate including the cores may further include non-volatile memory for storage of the profile information. In one such implementation, each core may include a portion of the non-volatile memory to store its profile information. Yet in other embodiments, a package of the many-core processor may include a separate substrate having the non-volatile memory. Still further, the non-volatile memory may be a separate component of a system including the many-core processor, for example, a flash memory such as a basic input/output system (BIOS), read only memory (ROM) or another non-volatile storage of the system. From block 240, control passes back to block 210, discussed above. Accordingly, method 200 may continue to perform dynamic testing during normal operation of a system including the many-core processor.

Referring back to diamond 220 of FIG. 3, if instead it is determined that the dynamic testing is not the original dynamic testing, control passes to block 250. There, the non-volatile memory may be updated with changed information (block 250). For example, if the results of the dynamic testing indicate that the operating parameters of one or more cores has changed, e.g., operation at a lower frequency or voltage, or failure of a functional correctness test, the profile information corresponding to the changed information may be updated in the non-volatile memory. Then, control passes back to block 210, discussed above. While described with this particular implementation in the embodiment of FIG. 3, it is to be understood that the scope of the present invention is not so limited, and other manners of obtaining profile information and storing the obtained information in a non-volatile storage may be performed in other embodiments.

Figure 4:
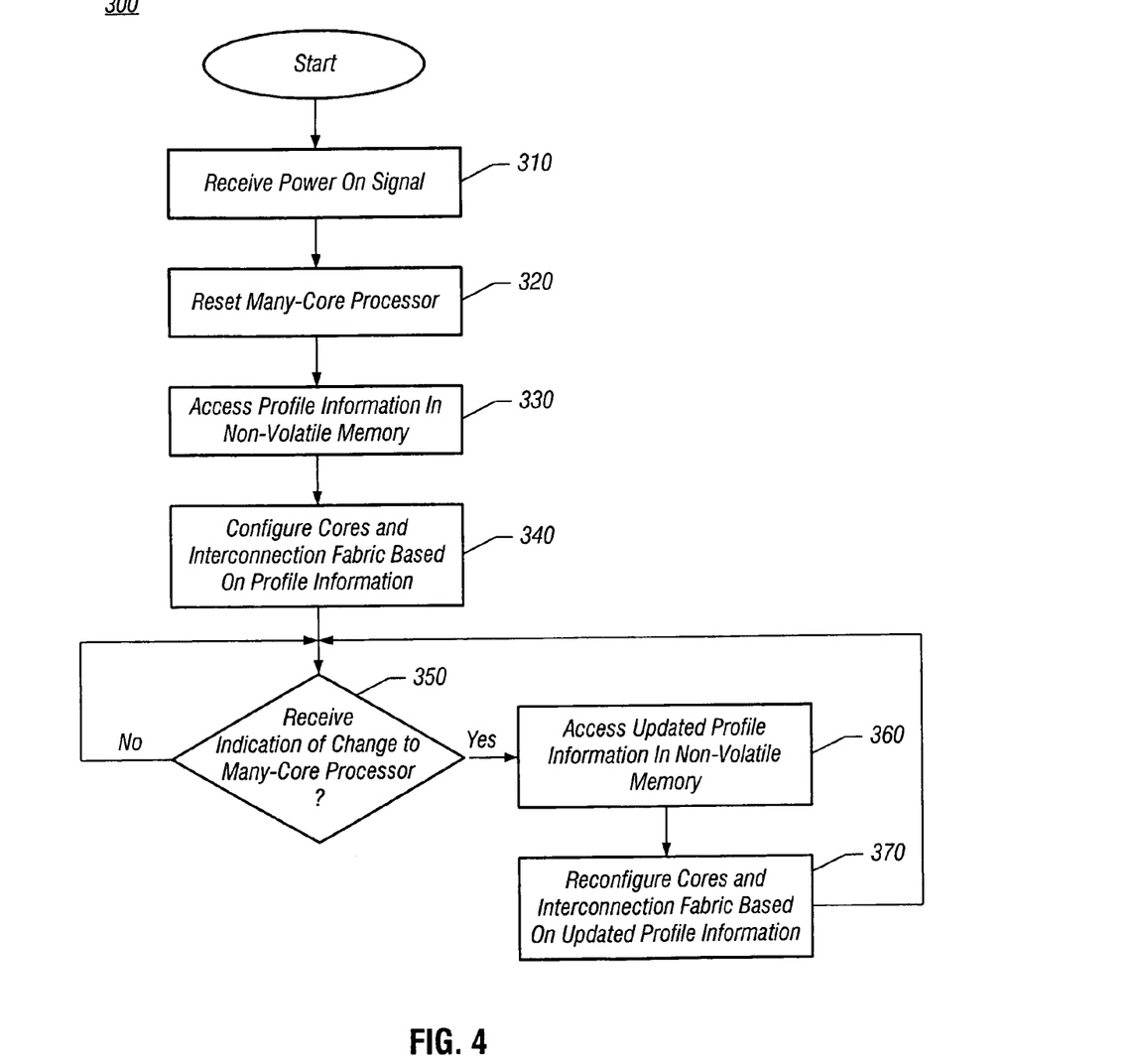
FIG. 4 is a flow diagram of a method for using profile information stored in a non-volatile memory in accordance with an embodiment of the present invention.

Referring now to FIG. 4, shown is a flow diagram of a method for using profile information stored in a non-volatile memory in accordance with an embodiment of the present invention. As shown in FIG. 4, method 300 may begin upon initialization of a processor, e.g., when a system including the processor is powered up. Accordingly, a power on signal may be received (block 310). This signal, when received in the processor, may cause a reset of the many-core processor (block 320). Such a reset may reset various resources of the processor, including each of the cores of the processor and the resources thereof including, for example, registers, execution units, buffers, caches and the like.

Still referring to FIG. 4, next profile information stored in the non-volatile memory may be accessed after reset has been performed (block 330). This access may seek profile information from wherever the non-volatile memory is located. For example, a control core may include logic or may be programmed to perform the request for the profile information. In some embodiments, such a control core may access non-volatile memory that is on the same die or in the same package as the cores. Or the non-volatile memory may be otherwise located in the system. In still other embodiments each core may access its own profile information that is stored in a non-volatile storage of the core itself.

In any event, the cores may be configured based on the profile information (block 340). For example, cores of one or more performance bins may be enabled. Furthermore, an interconnection fabric between enabled cores may be configured to provide for improved communication (also block 340). For example, the interconnection fabric may be dynamically configured to provide optimal data transfer between active cores based on the relative location of these cores.

After such configuration, normal operation of the many-core processor may be entered. Accordingly, various processes may be performed in one or more cores of the many-core processor. During such normal operation, at a selected time interval or upon an indication of a failure or degraded performance in one or more of the cores, dynamic testing of the cores may be performed, as described herein.

As a result of such testing, changes to the many-core processor, such as availability of cores, maximum operating speed of one or more cores or similar such changes may be identified. Accordingly, still referring to FIG. 4, at diamond 350 it may be determined whether an indication of a change to the many-core processor has been received (diamond 350). For example, such an indication may be initiated upon an update to the non-volatile memory with updated profile information. If no such indication is received, normal operation of the many-core processor continues.

If instead at diamond 350 an indication of a change to the many-core processor is received, control may pass to block 360. There, the updated profile information may be accessed from the non-volatile memory (block 360). The updated information may be readily identified, for example, by association of an update flag with the updated profile information. The updated profile information may thus provide trending information via comparison of parameters obtained during a current dynamic test and those obtained from previous testing. Reliability of a core may be indicated by the trending information of parameters that characterize the core. As described, the updated profile information may correspond to an indication of a failed core or reduced maximum operation speed of a core, for example. Based on this updated information, one or more cores of the many-core processor may be reconfigured (block 370). Furthermore, to efficiently provide communication between such reconfigured cores, the interconnection fabric may also be reconfigured, in some embodiments (also block 370).

Reconfiguration of the cores may include reassignment of one or more cores to a fast bin, slow bin, spare bin or the like. The number of bins may be tuned so as to obtain better control of the number of cores in a particular bin. A core may be moved from the fast bin to the slow bin over time due to degradation in its performance. When this occurs, a number of options may be pursued to maintain the performance of the processor at its count level. A spare core may be added to the fast bin, or existing cores may be run at a higher frequency using voltage scaling or body bias adjustment techniques.

In another example, cores may be grouped into bins according to the level of their power consumption or according to other parameters such as reliability parameters. Yet in another example, cores may be grouped into different sets of bins: one set according to the operating speed; one according to the power consumption level; one according to reliability parameters; and so forth. In one embodiment, cores may be grouped into different sets of bins after dynamic profiles are built. The binning process may be performed by a software/firmware module embedded in the many-core processor. In another embodiment, the binning process may be performed when a task is received by an operating system (OS) so that cores may be grouped into bins according to the specific task requirements.

As shown in FIG. 4, control may pass from block 370 back to diamond 350 for continued normal operation of the many-core processor. While described with this particular implementation in the embodiment of FIG. 4, it is to be understood that the scope of the present invention is not so limited, and different manners of accessing non-volatile storage to obtain profile information and use such information in allocation/reallocation or configuration/reconfiguration operations of the many-core processor may be implemented.

However, it is to be understood that reconfiguration need not necessarily occur when profile information is updated. For example, if the updated information indicates that a given core is no longer operating at its maximum frequency, the operating voltage provided to the core may be increased to obtain the same level of performance out of the core. Furthermore, instead of reconfiguring cores and/or interconnection fabric, currently-running processes may be moved to one or more different cores to attain a substantially similar level of performance without reconfiguration.

Thus in various embodiments, a resilient state of the many-core processor may be stored in a non-volatile memory. Such a resilient state may include profile information corresponding to the various cores, as well as current configuration information, such as configuration of the interconnection fabric, partitioning of the cores, voltage and frequency operation of the cores, and so forth. Such resilient state may be used to enable power up and recovery from faults. For example, the resilient state may be used to configure the many-core processor on power up and after reset, as well as to reconfigure the many-core processor upon a fault or other diminution in performance of one or more cores.

A range of non-volatile memory technologies may be implemented as the non-volatile memory in different embodiments. In some embodiments, a flash memory may be used to record the resilient state of the many-core processor. Such a flash memory may support block erase operations. In different implementations, a flash memory may support various read modes, as well as different programming modes. Depending upon the location of the non-volatile memory (e.g., on-chip or off-chip), security measures may be implemented in transferring information to and from the memory. For example, where the resilient state information is stored in an off-chip non-volatile memory, e.g., on a flash read only memory (ROM) device, the resilient state may be stored in an encrypted format and may be transmitted to the many-core processor in an encrypted manner.

Thus using embodiments of the present invention, state information regarding the current profile and reliability of a many-core processor may be maintained, even during sleep and standby states, as well as other power management techniques. Of course, such information may also be maintained while power to the many-core processor is off via the non-volatile memory. Using embodiments of the present invention, a many-core environment facing increased susceptibility to errors may provide reliable computing using resilient state information maintained in non-volatile memory.

The interconnect fabric in a many-core processor (such as the one shown in FIGS. 1 and 2) may be reconfigurable so as to derive good benefit from each bin of cores. Since the membership of a core in a particular bin may change over time, the bandwidth and latency between cores is subject to wide fluctuation with a static fabric. Thus, the interconnection fabric may be flexible and dynamically reconfigurable. When a mix of cores in the bins is changed, the available bandwidth and latency across cores in a bin may be evaluated and the fabric may be reconfigured if necessary to maintain a high level of connectivity. While the physical location of the cores on the die may not change, switches that form the fabric may be reconfigured so that cores in the same bin are in logical proximity to each other. The availability of multiple cores, the pool of spare cores and a high connectivity fabric enables quick recovery from faults with minimal performance degradation. As soon as a test identifies a problem with a particular core, that core may be decommissioned and moved out of active service. A core from the spare pool may take its place. Accordingly, the interconnect fabric may also be reconfigured to mitigate the effect of the faulty core being dropped from service, improving the ability of the processor to tolerate faults due to variation and degradation.

Figure 5:
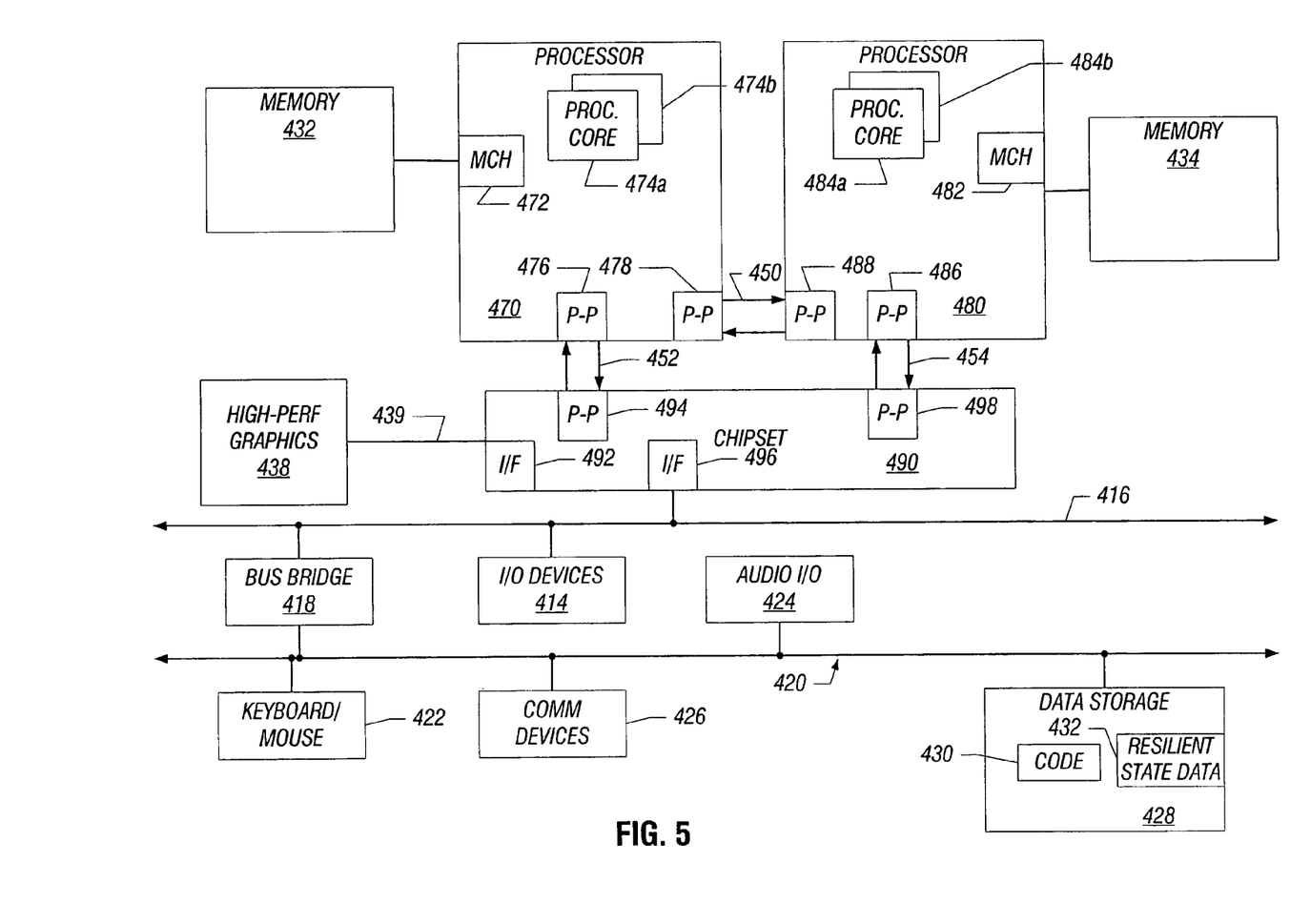
FIG. 5 is a block diagram of a multiprocessor system in accordance with an embodiment of the present invention.

Embodiments may be implemented in many different system types. Referring now to FIG. 5, shown is a block diagram of a multiprocessor system in accordance with an embodiment of the present invention. As shown in FIG. 5, the multiprocessor system is a point-to-point interconnect system, and includes a first processor 470 and a second processor 480 coupled via a point-to-point interconnect 450. As shown in FIG. 5, each of processors 470 and 480 may be multicore processors, including first and second processor cores (i.e., processor cores 474a and 474b and processor cores 484a and 484b). Each of processors 470 and 480 may further include non-volatile memory to store resilient state data regarding the cores of the corresponding processor. First processor 470 further includes a memory controller hub (MCH) 472 and point-to-point (P-P) interfaces 476 and 478. Similarly, second processor 480 includes a MCH 482 and P-P interfaces 486 and 488. As shown in FIG. 5, MCH's 472 and 482 couple the processors to respective memories, namely a memory 432 and a memory 434, which may be portions of main memory locally attached to the respective processors.

First processor 470 and second processor 480 may be coupled to a chipset 490 via P-P interconnects 452 and 454, respectively. As shown in FIG. 5, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the Accelerated Graphics Port Interface Specification, Revision 2.0, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the PCI Local Bus Specification, Production Version, Revision 2.1, dated June 1995 or a bus such as the PCI Express bus or another third generation input/output (I/O) interconnect bus, although the scope of the present invention is not so limited.

As shown in FIG. 5, various I/O devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a data storage unit 428 which may include code 430, in one embodiment. Data storage unit 428, which may be a non-volatile storage such as a flash memory, further may include resilient state data 432 to store resilient state data for processors 470 and 480, in some embodiments. Further, an audio I/O 424 may be coupled to second bus 420.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a many-core processor including a plurality of cores coupled via an interconnection fabric, each of the plurality of cores including at least one execution unit, register, buffer and cache; and
   a non-volatile memory coupled to the many-core processor to store resilient state data including a profile for each of the plurality of cores, the profile including an operational frequency, a power consumption level, and a functional correctness indicator for the associated core to indicate whether operation of the core is correct, as determined via self-testing performed within and by the many-core processor.

2. The apparatus of claim 1, wherein the many-core processor and the non-volatile memory are located in a single integrated circuit (IC).

3. The apparatus of claim 2, wherein the many-core processor and the non-volatile memory are located on a single substrate of the IC.

4. The apparatus of claim 1, wherein each of the plurality of cores includes a portion of the non-volatile memory.

5. The apparatus of claim 1, wherein the many-core processor is to update the profile of a core after an operational change to the core corresponding to a degraded performance level for the core, and to indicate the update by association of an update flag with the updated profile.

6. The apparatus of claim 1, wherein the many-core processor is to access the resilient state data upon initialization to determine one or more of the plurality of cores to enable.

7. The apparatus of claim 1, wherein the resilient state data includes bin information corresponding to a segmentation of the plurality of cores into a plurality of performance bins and configuration information of the interconnection fabric.

8. The apparatus of claim 1, wherein the apparatus comprises a semiconductor package including a first substrate supporting the many-core processor and a second substrate supporting the non-volatile memory.

9. The apparatus of claim 1, wherein the non-volatile memory further comprises a basic input/output system (BIOS).

10. The apparatus of claim 1, wherein the profile further includes task allocation information regarding one or more cores to be allocated to a task.

11. The apparatus of claim 5, wherein the updated profile is to provide trending information, and the many-core processor is to reconfigure at least one core based on the updated profile.

12. The apparatus of claim 11, wherein the reconfiguration is to reassign the at least one core from a first bin to a second bin of a plurality of bins.

13. The apparatus of claim 12, wherein the reconfiguration is to further reassign a spare core of the many-core processor to the first bin.

14. The apparatus of claim 1, wherein the self-testing of a first core is to be performed by a neighboring core of the many-core processor.

15. The apparatus of claim 1, wherein the self-testing of a first core is to be performed by a dedicated tester core of the many-core processor.

16. A processor comprising:

a plurality of cores coupled via an interconnection fabric, each of the plurality of cores including at least one execution unit, register, buffer and cache, the plurality of cores partitioned into a plurality of bins based on dynamic self-testing performed in the plurality of cores, wherein at least one spare core is controllable to be inserted into one of the plurality of bins based on a failure of the dynamic self-test of another core in the one bin, and a non-volatile memory coupled to the plurality of cores to store resilient state data including a profile for each of the plurality of cores, the profile including a functional correctness indicator for the associated core to indicate whether operation of the core is correct, as determined by the dynamic self-testing.

17. The processor of claim 16, wherein the plurality of cores and the non-volatile memory are located in a single integrated circuit (IC).

18. The processor of claim 17, wherein the plurality of cores and the non-volatile memory are located on a single substrate of the IC.

19. The processor of claim 16, wherein each of the plurality of cores includes a portion of the non-volatile memory.

\* \* \* \* \*